United States Patent
Hara (10) Patent No.: US 6,459,781 B1
(45) Date of Patent: *Oct. 1, 2002

(54) KEY TELEPHONE APPARATUS WITH CALL DISTRIBUTION FUNCTION

(75) Inventor: Masahiko Hara, Sagamihara (JP)

(73) Assignee: Kabushiki Kaisha Toshiba (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/703,830

(22) Filed: Nov. 1, 2000

Related U.S. Application Data (63) Continuation of application No. 09/325,372, filed on Jun. 4, 1999, now Pat. No. 6,175,617, which is a continuation of application No. 08/917,556, filed on Aug. 26, 1997, now Pat. No. 5,987,109, which is a continuation of application No. 08/518,711, filed on Aug. 24, 1995, now Pat. No. 5,712,909.

(30) Foreign Application Priority Data

Aug. 25, 1919 (JP) ............................................. 6-200984

(51) Int. Cl.⁷ .......................... H04M 1/00; H04M 3/00; H04M 5/00
(52) U.S. Cl. ........................ 379/156; 379/164; 379/165; 379/265.02; 379/265.03; 379/265.06
(58) Field of Search ......................... 379/34, 156, 157, 379/161, 164, 165, 166, 258, 265, 266, 268, 269, 308, 309, 265.01, 265.02, 265.03, 265.06, 266.01

(56) References Cited

U.S. PATENT DOCUMENTS

| | | | |
|---|---|---|---|
| 4,150,259 A | * 4/1979 | Fenton et al. | ................ 379/205 |
| 4,449,017 A | * 5/1984 | Burke et al. | ................. 379/373 |
| 4,451,705 A | * 5/1984 | Burke et al. | ................. 379/221 |
| 4,510,351 A | * 4/1985 | Costello et al. | ................ 379/34 |
| 5,432,846 A | * 7/1995 | Norio | .......................... 379/226 |
| 5,465,286 A | * 11/1995 | Clare et al. | ..................... 379/34 |
| 5,479,497 A | * 12/1995 | Kovarik | ...................... 379/265 |
| 5,499,291 A | * 3/1996 | Kepley | ......................... 379/265 |
| 5,577,112 A | * 11/1996 | Cambray et al. | ........... 379/216 |
| 5,757,897 A | * 5/1998 | LaBarbera et al. | ........ 379/67.1 |
| 5,815,566 A | * 9/1998 | Ramot et al. | ................ 379/265 |
| 5,818,907 A | * 10/1998 | Maloney et al. | .............. 379/34 |

* cited by examiner

Primary Examiner—Binh Tieu
(74) Attorney, Agent, or Firm—Squire, Sanders & Dempsey, L.L.P.

(57) ABSTRACT

This invention relates to a key telephone apparatus which includes a key telephone main unit which accommodates a plurality of extension terminals each having a display via extensions and is connected to a network via an office line, and has an ACD function of forming a group of the plurality of extension terminals, and selectively distributing an incoming call received from the network to the plurality of extension terminals belonging to the group to receive the incoming call. The key telephone main unit includes a processing condition management unit for monitoring the processing condition of the incoming call by the automatic call distribution function, and storing data indicating the processing condition, and a display control unit for receiving a predetermined processing condition display request output from one of the plurality of extension terminals, generating display data for displaying the data indicating the processing condition stored in the processing condition management unit, and supplying the display data to the extension terminal as the display request source to be displayed on the display of the extension terminal.

26 Claims, 7 Drawing Sheets

| |
|---|
| ACD CALL TERMINATION COUNT |
| AGENT ACD CALL TERMINATION RESPONSE COUNT |
| NON-ACD CALL TERMINATION PROCESSING COUNT |
| ACD CALL TERMINATION QUEUE STATE LINE COUNT |

FIG. 6

| OFFICE LINE NUMBER | DISPLAY ON FLAG | QUEUE TIME COUNT VALUE |
|---|---|---|
| SL1 | ON | 15 SECONDS |
| SL2 | OFF | |
| SL3 | OFF | |
| ⋮ | ⋮ | ⋮ |
| SLm-1 | OFF | |
| SLm | OFF | 8 SECONDS |

FIG. 12A  ENTER ID CODE

FIG. 12B  QUE#001 AGT GP01
25 JUL TUE 04:34

FIG. 12C  QUE#001 SUP GP01
25 JUL TUE 04:34

KEY TELEPHONE APPARATUS WITH CALL DISTRIBUTION FUNCTION

This is a continuation of application Ser. No. 09/325,372, filed Jun. 4, 1999 now U.S. Pat. No. 6,175,617, which is a continuation of application Ser. No. 08/917,556, filed Aug. 26, 1997 now U.S. Pat. No. 5,987,109, which is a continuation of application Ser. No. 08/518,711, filed Aug. 24, 1995, now issued as U.S. Pat. No. 5,712,909.

BACKGROUND OF THE INVENTION

1. Field of the Invention

The present invention relates to an improvement in a key telephone apparatus comprising an ACD (Automatic Call Distribution) function.

2. Description of the Related Art

As is well known, in recent years, digital key telephone apparatuses with an ACD function have become popular. In the ACD function, a plurality of extension terminals constitute a single ACD group, and incoming calls from a network corresponding to the ACD group are equally distributed to the plurality of extension terminals in the ACD group. With this ACD function, a digital key telephone apparatus can prevent incoming calls from being concentrated on a specific extension terminal, and can efficiently process incoming calls.

In this case, one representative number is normally assigned to a single ACD group. For this reason, the calling party dials this representative number to call a target extension terminal in the ACD group.

In such a digital key telephone apparatus with the ACD function, a supervisor is set in advance in the ACD group, and monitors, e.g., the processing conditions of incoming calls to the extension terminals in the ACD group. Based on the monitor result, the supervisor assists an incoming call processing job to be executed by, e.g., an agent of the ACD group, and manages the operating condition of the digital key telephone apparatus.

However, conventional monitor means, which is used by the supervisor to monitor the ACD group, is realized by connecting an information management apparatus comprising, e.g., a personal computer to the main unit of the digital key telephone apparatus via a special-purpose connection unit. The supervisor acquires and totalizes information required for monitoring from the main unit of the digital key telephone apparatus by operating the information management apparatus, and manages the ACD function on the basis of the totalized result.

For this reason, in the conventional digital key telephone apparatus with the monitor means of the ACD function, since the information management apparatus and its special-purpose connection unit must be separately equipped, the system size and cost increase. In addition, a special-purpose program, control data, and the like must be input to the information management apparatus prior to its use, and a complicated operation procedure is required to start its operation. For this reason, since the supervisor is required of skills and expert knowledge, the load on the supervisor becomes heavy.

SUMMARY OF THE INVENTION

The present invention has been made in consideration of the above situation, and has as its object to provide a key telephone apparatus with an automatic call distribution function, which can realize a simple and compact arrangement, can reduce cost, and can greatly reduce the load on a supervisor by simplifying its operation, since it does not require any information management apparatus and its connection unit.

According to one aspect of the present invention, there is provided a key telephone apparatus which comprises a plurality of extension terminals each having a display, and a key telephone main unit which accommodates the plurality of extension terminals via extensions and is connected to a network via an office line, and has an automatic call distribution function of forming a group of the plurality of extension terminals, and selectively distributing an incoming call received from the network to the plurality of extension terminals belonging to the group to receive the incoming call, the key telephone main unit comprising:

processing condition management means for monitoring a processing condition of the incoming call by the automatic call distribution function, and storing data indicating the processing condition; and display control means for receiving a predetermined processing condition display request output from one of the plurality of extension terminals, generating display data for displaying the data indicating the processing condition stored in the processing condition management means, and supplying the display data to the extension terminal as the display request source to be displayed on the display of the extension terminal.

DETAILED DESCRIPTION OF THE PREFERRED EMBODIMENT

Figure 1:
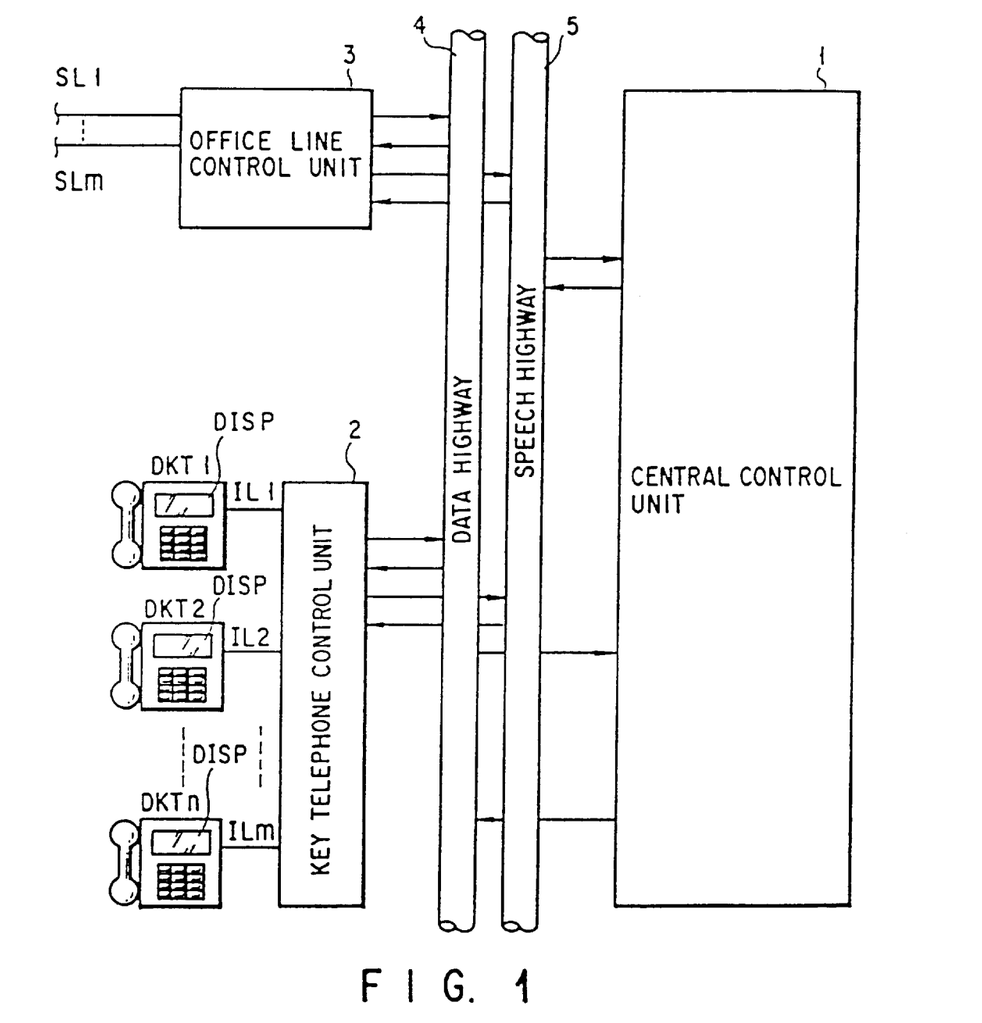
FIG. 1 is a block diagram showing an embodiment of a key telephone apparatus with the ACD function according to the present invention.

An embodiment of the present invention will be described in detail below with reference to the accompanying drawings. FIG. 1 shows the arrangement of the overall digital key telephone apparatus to be described in this embodiment. The digital key telephone apparatus comprises a central control unit 1, a key telephone control unit 2, an office line control unit 3, and data and speech highways 4 and 5 for transferring data and speech information among these units 1, 2, and 3.

Of these units, the key telephone control unit 2 is connected to a plurality of key telephone sets DTK1 to DKTn via extensions IL1 to ILn. The key telephone control unit 2 controls call origination and termination of the key telephone sets DTK1 to DKTn on the basis of an instruction output from the central control unit 1. Each of these key telephone sets DTK1 to DKTn is a digital key telephone set, and comprises a liquid crystal display DISP for displaying the telephone number of a station on the other end of the line and various kinds of information output from the central control unit 1.

The office line control unit 3 is connected to subscribers lines SL1 to SLm of a public network (not shown) or extensions of a private branch exchange (to be generally referred to as office lines SL1 to SLm hereinafter). The office line control unit 3 controls call origination and termination with respect to the public network or the private branch exchange.

Figure 2:
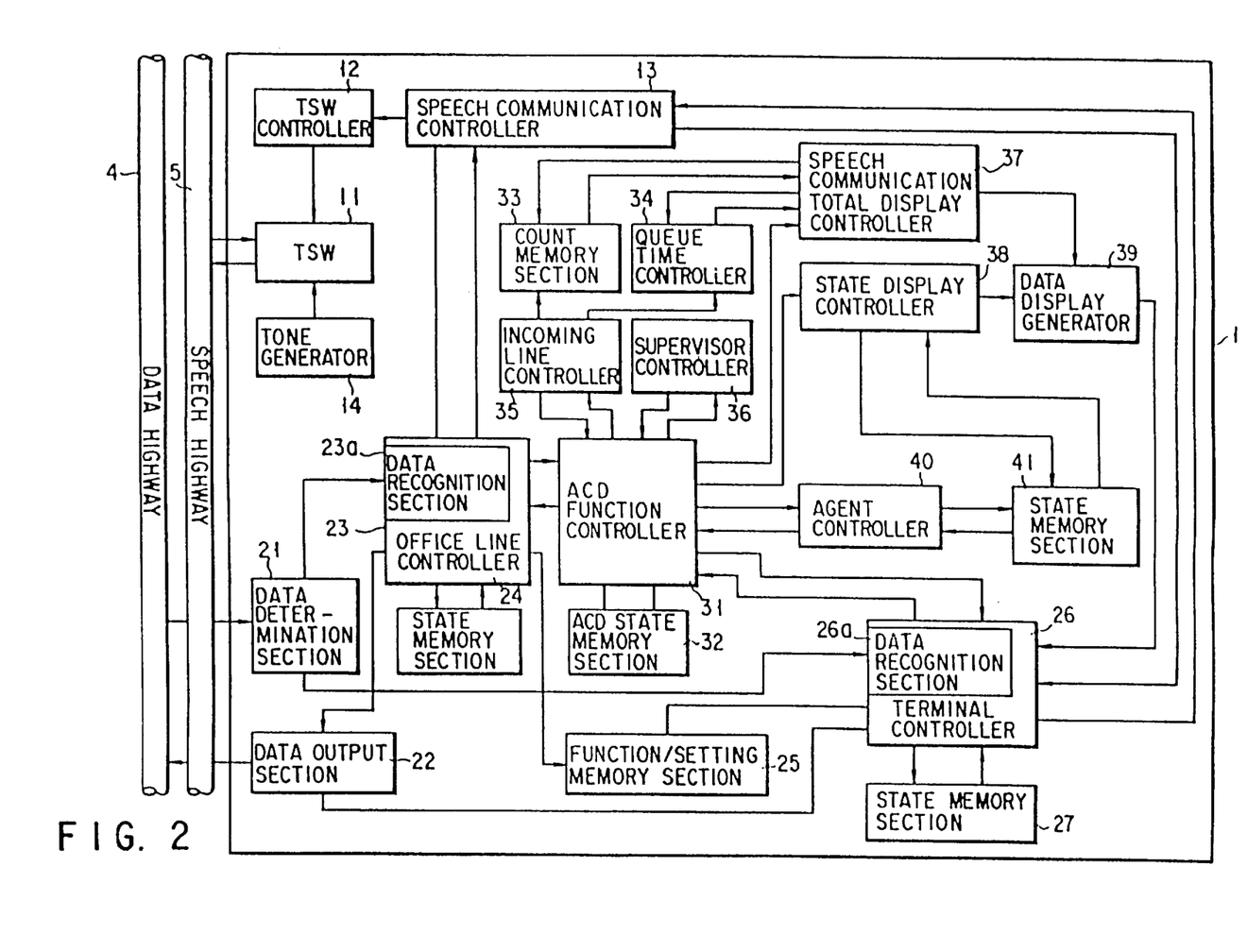
FIG. 2 is a block diagram showing the detailed functional arrangement of a central control unit in the embodiment shown in FIG. 1.

FIG. 2 shows the detailed functional arrangement of the central control unit 1. The central control unit 1 is constituted by four control systems, i.e., a speech communication control system, a data transmission control system, an office line/terminal control system, and an ACD control system. The speech communication control system comprises a time switch (TSW) 11, a time switch controller 12, a speech communication controller 13, and a tone generator 14.

The speech communication control system exchanges speech data transmitted on the speech highway 5 in such a manner that the time switch controller 12 controls the time switch 11 on the basis of an instruction output from the speech communication controller 13. Note that the tone generator 14 generates a tone signal used for informing, e.g., reception of an incoming call.

The data transmission control system is constituted by a data determination section 21, and a data output section 22. In this case, the data determination section 21 determines the type of data transmitted on the data highway 4, and transfers the data to an office line controller 23 or a terminal controller 26 (to be described later) on the basis of the determination result. The data output section 22 outputs the data output from the office line controller 23 and the terminal controller 26 onto the data highway 4.

Furthermore, the office line/terminal control system is constituted by the office line controller 23 with a data recognition section 23a, a state memory section 24 connected to the office line controller 23, a function setting/memory section 25, the terminal controller 26 with a data recognition section 26a, and a state memory section 27 connected to the terminal controller 26. Of these sections, the office line controller 23 is arranged to control the states of the office lines SL1 to SLm. More specifically, in order to control the states of the office lines SL1 to SLm, the office line controller 23 recognizes the contents of control data transferred from the data determination section 21 using the data recognition section 23a, generates required control data, and outputs the data to the data output section 22. In this case, the states of the office lines SL1 to SLm are stored in the state memory section 24.

The terminal controller 26 is arranged to control the states of the key-telephone sets DTK1 to DKTn. More specifically, in order to control the states of the key telephone sets DTK1 to DKTn, the terminal controller 26 recognizes the contents of control data transferred from the data determination section 21 using the data recognition section 26a, generates required control data, and outputs the data to the data output section 22, like in the office line controller 23. In this case, the states of the key telephone sets DTK1 to DKTn are stored in the state memory section 27. Note that the function setting/memory section 25 stores data indicating whether or not the ACD function is set for the office lines SL1 to SLm.

The ACD control system is constituted by an ACD function controller 31, an ACD state memory section 32 connected to the ACD function controller 31, a count memory section 33 for storing an ACD termination count, a queue time controller 34 for measuring an ACD termination queue time, an incoming line controller 35 for controlling ACD-terminated office lines SL1 to SLm, a supervisor controller 36, a speech communication total display controller 37, a state display controller 38, a display data generator 39, an agent controller 40, and a state memory section 41 for storing the state of an agent.

The ACD operation of the digital key telephone apparatus with the above-mentioned arrangement will be explained below. Assume that an incoming call is received from the public network via one of the office lines SL1 to SLm in a standby state. The incoming call is detected by the office line control unit 3, and is informed to the office line controller 23 of the central control unit 1 via the data highway 4. The office line controller 23 checks if one, through which the incoming call is received, of the office lines SL1 to SLm is an ACD-registered office line. If the office line through which the incoming call is received is an ACD-registered office line, a message indicating this is informed to the ACD function controller 31.

In this case, the ACD function controller 31 supplies a message indicating that an incoming call is generated on an ACD-registered office line to the incoming line controller 35. The incoming line controller 35 increments the ACD call termination count stored in the count memory section 33, and stores the incremented ACD call termination count in the count memory section 33. The ACD function controller 31 instructs the agent controller 40 to execute ACD call termination control, so that the agent of an ACD-registered extension receives the call.

The agent controller 40 searches for an extension of an agent which can receive the call. If the detected extension is ACD-registered, the agent controller 40 supplies an instruction to the terminal controller 26 via the ACD function controller 31 to control the extension to receive the call. As a result, the terminal controller 26 generates a call termination signal. The call termination signal is transferred from the data output section 22 to the key telephone sets DTK1 to DKTn of the agent via the data highway 4. For this reason, the key telephone sets DTK1 to DKTn inform reception of an incoming call.

When the agent answers to the information, the answer response is transmitted to the ACD function controller 31 of the central control unit 1 via the key telephone control unit 2, and is then transmitted from the ACD function controller 31 to the incoming line controller 35. The incoming line controller 35 increments the total value of ACD call termination answer counts by the agent, and stores the incremented value in the count memory section 33.

On the other hand, when the ACD function controller 31 determines that it is impossible to attain ACD call termination for, e.g., the reason that the searched agent is not ACD-registered, the ACD function controller 31 instructs the office line controller 23 to execute predetermined overflow processing, and this processing is executed. In this case, the ACD function controller 31 supplies information indicating that non-ACD function processing is executed to the incoming line controller 35. The incoming line controller 35 increments the total value of non-ACD function processing counts, and stores the incremented value in the count memory section 33.

When the searched agent is ACD-registered but cannot receive the call for, e.g., the reason that the agent is busy, the ACD function controller 31 instructs the incoming line controller 35 to set the office line (incoming line) corresponding to the generated incoming call in a call termination queue state. In response to this instruction, the incoming line controller 35 sets the incoming line in the call termination queue state, and controls the queue time controller 34 to begin measurement of the queue time.

Thereafter, when the ACD function controller 31 recognizes that the agent is ready to receive the call, the ACD function controller 31 instructs the incoming line controller 35 to execute call termination processing. Thus, the incoming line controller 35 executes call termination processing for the key telephone set as a call termination destination. Simultaneously with the execution of the call termination processing, the incoming line controller 35 controls the queue time controller 34 to stop the measurement of the queue time.

Figure 3:
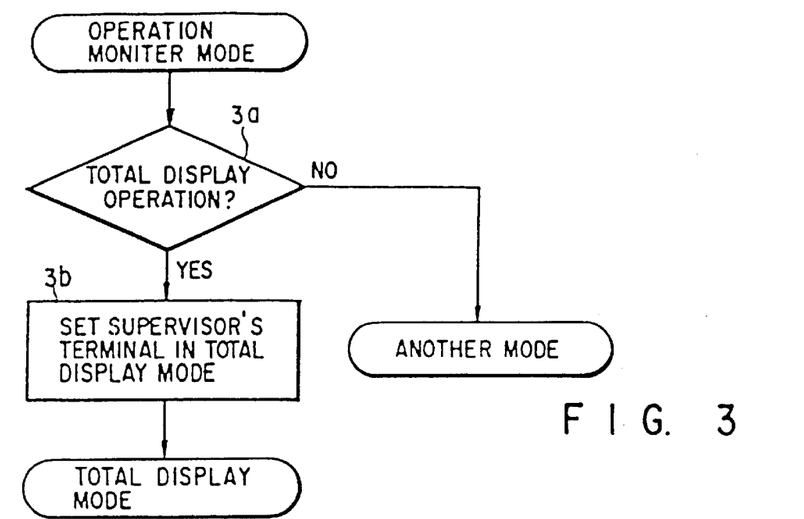
FIG. 3 is a flow chart showing the control procedure and the control contents of an operation monitor mode in the central control unit.

When the supervisor monitors the execution condition of the above-mentioned ACD function, a special operation for requesting a speech communication total display must be performed using the ACD-registered key telephone set. When this special operation is performed, as shown in FIG. 3, the control of the ACD function controller 31 advances from the processing in step 3a to the processing in step 3b, and the key telephone set at which the special operation was performed is set in an ACD speech communication total display mode. Thereafter, an ACD speech communication total display operation is executed.

Figure 4:
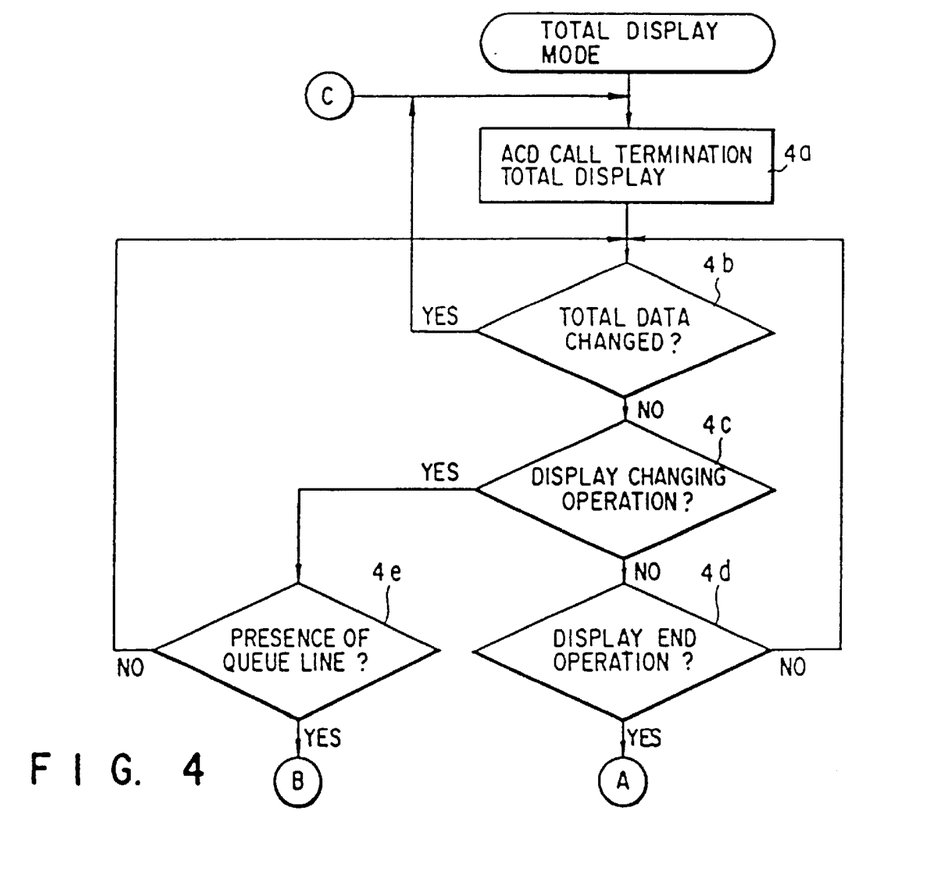
FIG. 4 is a flow chart showing the control procedure and the control contents in the former half of an ACD total display mode in the central control unit.
Figure 5:
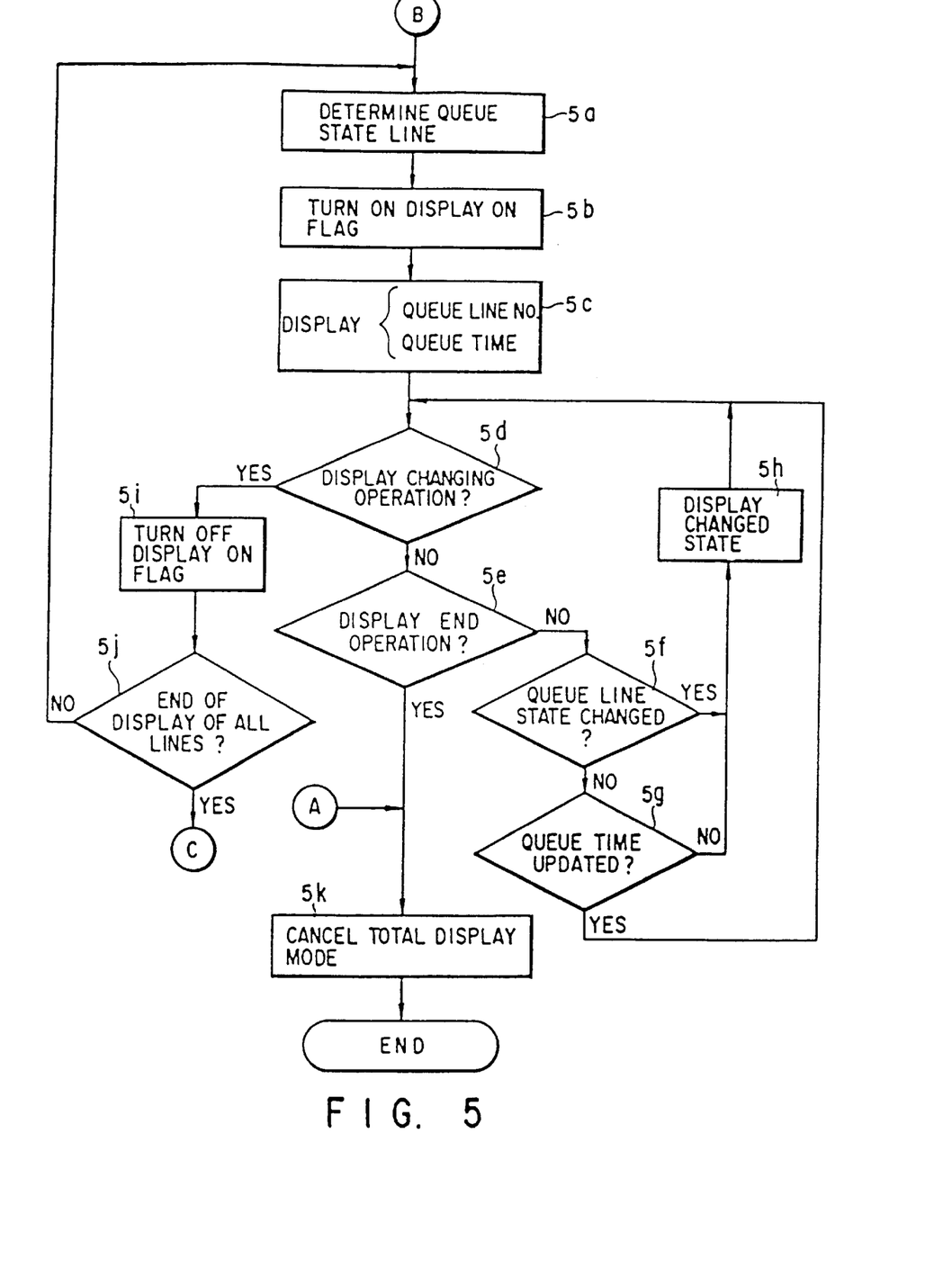
FIG. 5 is a flow chart showing the control procedure and the control contents in the latter half of the ACD total display mode in the central control unit.

FIGS. 4 and 5 show the control procedure and control contents of the an ACD speech communication total display operation. In step 4a, the ACD function controller 31 reads out the current ACD call termination count, the ACD call termination answer count by the agent, the non-ACD function processing count, and the current ACD call termination queue state line count from the count memory section 33, and supplies these count data and a display data generation instruction to the display data generator 39 via the speech communication total display controller 37. Note that the count memory section 33 stores the ACD call termination count, the ACD call termination answer count by the agent, the non-ACD function processing count, and the current ACD call termination queue state line count using the memory map shown in FIG. 6.

Figure 6:
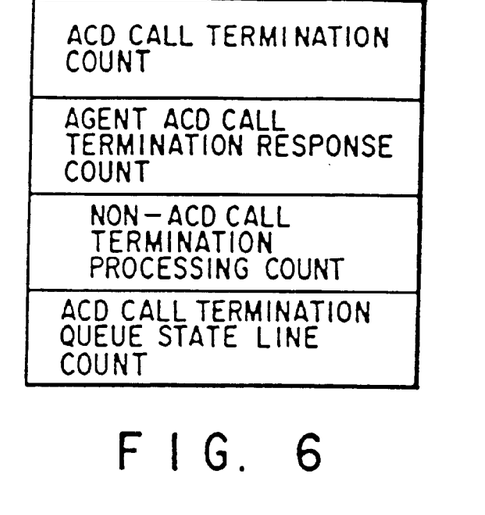
FIG. 6 is a view for explaining the memory map of a memory for storing various counts associated with ACD call termination in the embodiment shown in FIG. 1.

The ACD call termination count, the agent ACD call termination response count, the non-ACD call termination processing count, and the ACD call termination queue state line count shown in FIG. 6 are defined as follows.

ACD Call Termination Count
   a call termination processing count by the system for the ACD function on the basis of the function setting (regardless of the response or non-response by the agent).

Agent ACD Call Termination Response Count
   a call termination response (processing) count by the agent upon call termination processing to the agent by the ACD function.

Non-ACD Call Termination Processing Count
   a non-ACD functional processing count by the system without any call termination response by the agent although ACD call termination processing is performed (including a processing count which is discarded by the sender during the queue state of call termination to the agent).

ACD Call Termination Queue State Line Count
   a line count representing lines waiting for call termination since a target agent is in a queue state or the like to disable immediate call termination although ACD call termination processing is performed.

The display data generator 39 generates initial screen data for displaying the respective count data, and transfers this display data to the terminal controller 26. The display data is supplied from the terminal controller 26 to the key telephone set, at which the special operation was performed, via the data output section 22, and is displayed on the liquid crystal display DISP of the key telephone set. Therefore, the supervisor can confirm the execution condition of the ACD function on the basis of the count data displayed on the liquid crystal display DISP of the key telephone set.

When the ACD call termination count, for example, changes during the display operation of the count data, the control of the ACD function controller 31 returns from the processing in step 4b to the processing in step 4a. More specifically, the ACD function controller 31 instructs the speech communication total display controller 37 to update (refresh) the displayed contents. The speech communication total display controller 37 reads out new count data from the count memory section 33, and transfers them to the display data generator 39. The display data generator 39 generates updated display screen data on the basis of the input new count data. The updated display screen data is supplied from the terminal controller 26 to the key telephone set, at which the special operation was performed, via the data output section 22, and is displayed on the liquid crystal display DISP of the key telephone set. Therefore, the supervisor can always confirm the latest count data.

When the supervisor wants to know the condition of the call termination queue lines in more detail, the supervisor executes a display changing operation at the key telephone set. The ACD function controller 31 detects this display changing operation in step 4c, and its control advances to the processing in step 4e. In step 4e, the controller 31 confirms the presence of any call termination queue lines. When the presence of any call termination queue lines is confirmed, the ACD function controller 31 instructs the supervisor controller 36 to chance the display mode. In response to the display mode changing instruction, the supervisor controller 36 fetches the office line numbers in the call termination queue state from the incoming line controller 35 via the ACD function controller 31, and outputs a display instruction of data associated with the call termination queue lines to the speech communication total display controller 37 via the ACD function controller 31.

Figure 7:
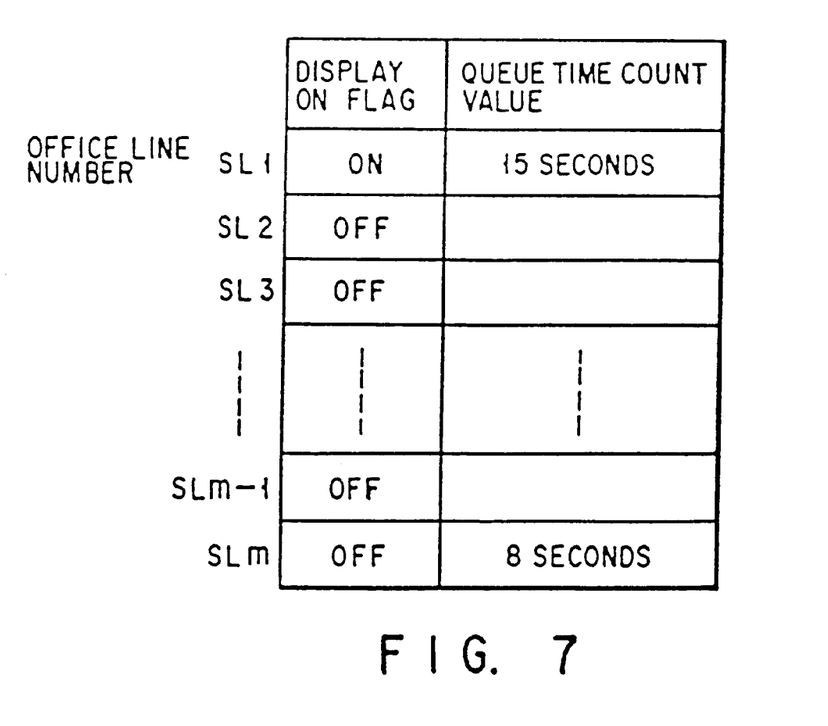
FIG. 7 is a view for explaining the memory map of a memory for storing ACD call termination queue states and their queue times in units of office lines in the embodiment shown in FIG. 1.

Upon reception of this display instruction, the speech communication total display controller 37 supplies the call termination queue line numbers to the queue time controller 34 in step 5a to read out the office line number of the office. line corresponding to the longest queue time and its queue time from the queue time controller 34. For example, assume that the queue time controller 34 is measuring the call termination queue times of the respective office lines, as shown in FIG. 7. In this state, since the office line number SL1 is determined as the office line corresponding to the longest queue time, the office line number SL1 and its queue time data "15 seconds" are read out from the queue time controller 34.

Thereafter, in step 5b, the speech communication total display controller 37 switches a display ON flag corresponding to the determined office line number SL1 among the queue time data held in the queue time controller 34 to the ON state, as shown in FIG. 7. The speech communication total display controller 37 transfers data indicating the office line number SL1 and its queue time to the display data generator 39 in step 5c. The display data generator 39 generates display screen data for displaying the above data, and transfers this display screen data to the terminal controller 26. For this reason, the display screen data is supplied to the key telephone set of the supervisor via the data output section 22, and is displayed on the liquid crystal display DISP of the key telephone-set.

Assume that the supervisor performs another display changing operation during the display operation of the data associated with the call termination queue lines. The ACD function controller 31 detects this operation in step 5d, and its control advances to the processing in step 5i. More specifically, the ACD function controller 31 switches the display ON flag, which corresponds to the office line number SL1 and has been switched to the ON state, to the OF state. Thereafter, the ACD function controller 31 checks in step 5j all the office lines in the call termination queue state if the display operations of data indicating their office line numbers and their queue times are completed.

If any non-displayed office line remains, the control of the ACD function controller 31 returns to the processing in step 5a. in step 5a, the speech communication total display controller 37 selects the office line corresponding to the second longest queue time from the queue time controller 34, and reads out the office line number and queue time of the selected office line. Then, the controller 37 outputs these data to the display data generator 39. The display data generator 39 generates display screen data for displaying the input data, and transfers the display screen data to the terminal controller 26. Thus, the display screen data is supplied from the terminal controller 26 to the key telephone set of the supervisor via the data output section 22, and is displayed on the liquid crystal display DISP of the key telephone set.

Thereafter, each time the supervisor performs a display changing operation at the key telephone set, data of the office line number and its queue time are read out from the queue time controller 34 in units of longer queue time, are supplied to the key telephone set, and are displayed on the liquid crystal display DISP. Therefore, when there are a plurality of office lines in the call termination queue state, the supervisor can confirm the office line numbers and their queue times in the queue state which are scroll-displayed in the order of longer queue times by executing the display changing operation at the key telephone set. When the liquid crystal display DISP has a large display capacity, data of a plurality of office lines in the call termination queue state can be simultaneously displayed.

Since the call termination queue time changes every moment, the control of the speech communication total display controller 37 returns from the processing in step 5g to the processing in step 5d at a predetermined time interval during the display operation of the queue time associated with one call termination queue line, and the controller 37 updates the value of the displayed queue time. When the queue state of the line corresponding to the displayed queue time is canceled, the control of the ACD function controller 31 advances from the processing in step 5f to the processing in step 5h.

More specifically, the ACD function controller 31 controls the incoming line controller 35 to clear the queue time of the corresponding office line stored in the queue time controller 34. The ACD function controller 31 supplies state change information to the speech communication total display controller 37. Upon reception of this information, the speech communication total display controller 37 instructs the display data generator 39 to display a changed state. For this reason, state change display data is supplied to the key telephone set of the supervisor, and is displayed on the liquid crystal display DISP of the key telephone set.

In this manner, when the display operations of data associated with all the call termination queue lines are completed, the control of the ACD function controller 31 returns from the processing in step 5j to the processing in step 4a, and executes a display operation of ACD call termination total data as initial screen data. When the supervisor performs a display end operation at the key telephone set in the display state of the ACD call termination total data, the control of the ACD function controller 31 advances from the processing in step 5e to the processing in step 5k, and the controller 31 cancels the total display mode set in the key telephone set, thus ending the control in a series of ACD total display modes.

Figure 8:
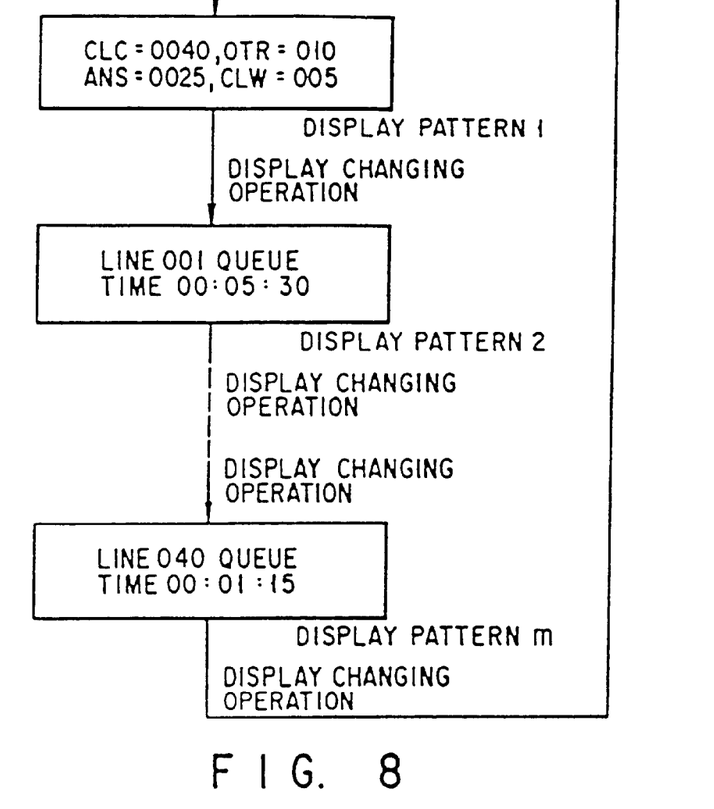
FIG. 8 is a view for explaining the display order and the display format used when various counts, queue states, and queue times stored in the memories are displayed on a display of an extension terminal of a supervisor.

FIG. 8 shows examples of the displayed contents on the liquid crystal display DISP when the supervisor performs a special operation for requesting a speech communication total display operation at a key telephone set. When this special operation is performed, the key telephone set is set in the ACD speech communication total display mode. The liquid crystal display DISP simultaneously displays an ACD. call termination count CLC, an ACD call termination answer count ANS, a non-ACD function processing count OTR, and an ACD call termination queue line count CLW, as shown in display pattern 1 in FIG. 8. In the example shown in FIG. 8, CLC=40, ANS=25, OTR=10, and CLW=5.

When the supervisor performs the display changing operation in the above-mentioned display state of the count data, the liquid crystal-display DISP is switched to display the office line number, LINE001, of an office line corresponding to the longest call termination queue time and its queue time "00:05:30", as shown in display pattern 2 in FIG. 8. Thereafter, the liquid crystal. display DISP sequentially displays data of the office line numbers in the queue state and queue times in the order of longer queue time every time the supervisor performs a display changing operation. When the supervisor performs another display. changing operation in a state wherein the office line number, LINE040, of an office line corresponding to the shortest call termination queue time, and its queue time "00:01:15" are displayed, as shown in display pattern m in FIG. 8, the display state of the liquid crystal display DISP is returned to that shown in display pattern 1.

Figure 9:
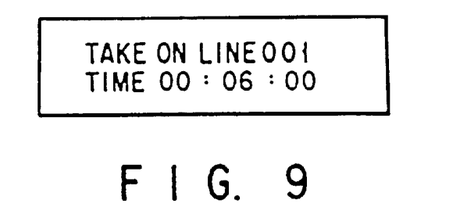
FIG. 9 is a view for explaining the display format used when an agent receives a call during the display operation of the queue time.
Figure 10:
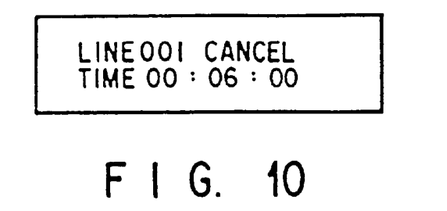
FIG. 10 is a view for explaining the display format used when an incoming call is stopped during the display operation of the queue time.

For example, when the office line is set in the agent call termination state in a state wherein the office line number LINE001 and its queue time "00:05:30" are displayed, as shown in, e.g., display pattern 1, the display state of the liquid crystal display DISP is switched to the one shown in FIG. 9, and information indicating that the call termination is attained and the queue time measured are displayed. Furthermore, when the office line is set in a call stop state in a state wherein the office line number LINE001 and its queue time "00:05:30" are displayed, as shown in, e.g., display pattern 1, the display state of the liquid crystal display DISP is switched to the one shown in FIG. 10, and information indicating that the call termination is canceled and the queue time measured are displayed.

As described above, according to this embodiment, the control system for the ACD total display operation, which includes the ACD function controller 31 as a main section, is arranged in the central control unit 1. Every time an ACD incoming call is received, the call termination count, the incoming call answer count by the agent, the call termination queue state line count, and the like are stored, and when a display request is input from the key telephone set, the stored count data are transferred to the key telephone set to display the data on the liquid crystal display DISP. Furthermore, when a display changing operation is performed at the key telephone set in this state, the number and queue time of the call termination queue line are transferred to the key telephone set to be displayed thereon.

For this reason, the supervisor can confirm data representing the processing condition of the ACD function on the liquid crystal display DISP of an arbitrary key telephone set. Thus, since an independent information management apparatus need not be connected to the main unit of the key telephone apparatus via a special-purpose connection unit unlike in the conventional apparatus, a simple and compact system arrangement of the key telephone apparatus can be realized, and its cost can also be reduced. Since no complicated start operation of the apparatus is required unlike in a case wherein the information management apparatus is used, the load of the operation on the supervisor can be greatly reduced. Furthermore, even a supervisor who has neither skills nor expert knowledge can easily use the key telephone apparatus.

Figure 11:
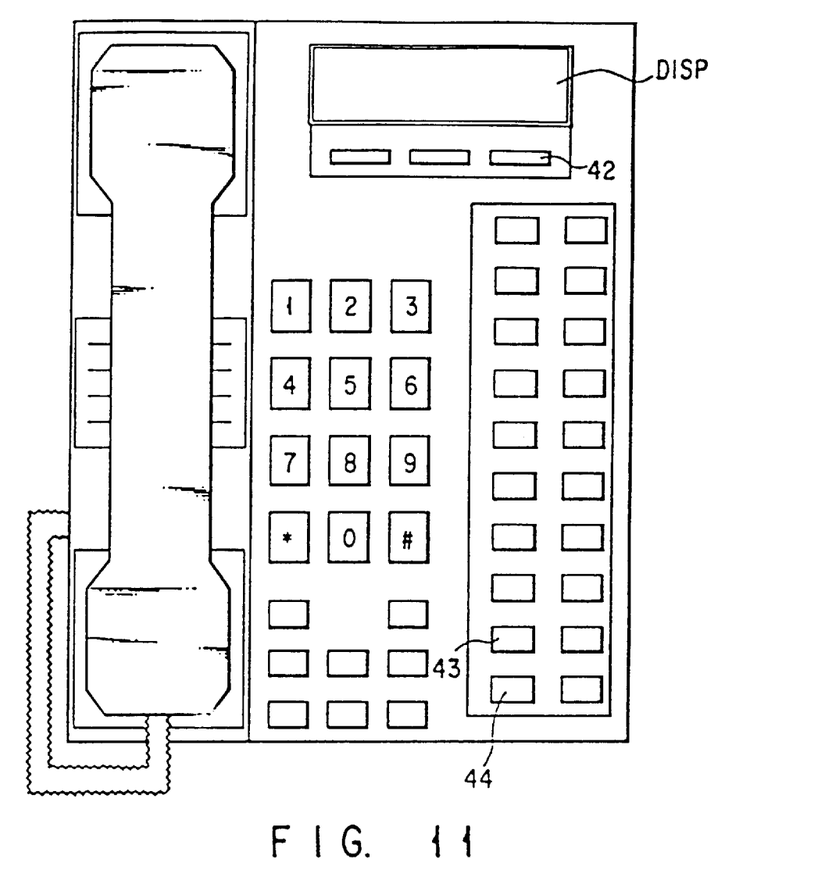
FIG. 11 is a plan view for explaining the layout of a display and various operation keys arranged on a key telephone set serving as an extension terminal.

FIG. 11 shows the outer appearance of the key telephone set. A key 42 is assigned as a display change key. More specifically, when the key 42 is operated in a state wherein information representing, e.g., a line in a call termination queue state is displayed on a liquid crystal display DISP, the display change operation shown in FIG. 8 is performed. When the key telephone set is set in a normal mode, the key 42 has another function.

Figure 12A:
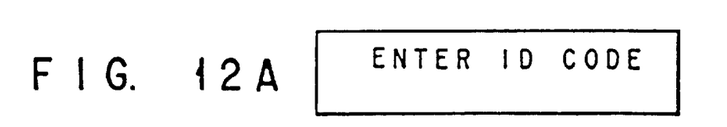
FIGS. 12A to 12C are views for explaining the display formats of a display in operations for performing log-in of a key telephone set to the ACD function.

An operation for performing log-in of the key telephone set in the normal mode to the ACD function as the agent or supervisor will be described below. During the normal queue state of the key telephone set, a LOG IN key 43 or an extension key 44 is operated, and a special dial (e.g., #4031) is input. The key telephone set is then set in a password input queue state, and a message shown in FIG. 12A is displayed on the liquid crystal display DISP.

Figure 12B:
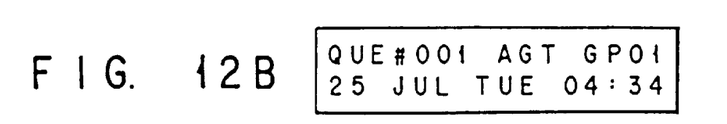
Figure 12C:
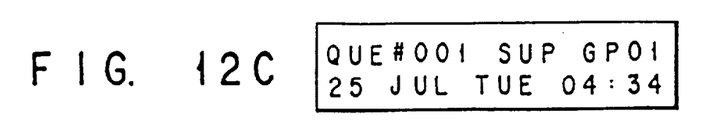

When a password is input to the key telephone set, the terminal controller 26 compares the input password with the supervisor or agent password prestored in the function setting/memory section 25. As a result of this comparison, when the ACD log-in as the agent is confirmed, the terminal controller 26 informs the ACD function controller 31 of the agent log-in, and a message shown in FIG. 12B is displayed on the liquid crystal display DISP of the log-in key telephone set. As a result of the above comparison, if ACD function log-in as the supervisor is confirmed, the terminal controller 26 informs the ACD function controller 31 of the supervisor log-in to ACD function, and a message shown in FIG. 12C is displayed on the liquid crystal display DISP of the log-in key telephone set.

If the log-in is of an agent, the ACD function controller 31 having received the information representing log-in to the ACD function informs the agent controller 40 of the agent log-in, and the agent state is stored in the state memory-section 41. If the log-in is of a supervisor, the ACD function controller 31 informs the supervisor controller 36 of the supervisor log-in. By the above operations, the corresponding key telephone set operates on the ACD function in accordance with a log-in state.

The present invention is not limited to the above embodiment, and various changes and modifications may be made within the spirit and scope of the invention.

What is claimed is:

1. A call distribution system including a plurality of extension terminals, at least one of which has a display, and a main unit connectable to the plurality of extension terminals via extensions and connectable to a network via an office line, and which has a call distribution function of grouping the plurality of extension terminals and distributing incoming calls received from the network to the plurality of extension terminals belonging to groups to receive the incoming calls, said main unit comprising:

processing condition management means for monitoring a processing condition of the incoming calls, and storing data indicating the processing condition of the incoming call; and display control means for receiving a predetermined processing condition display request output from said at least one extension terminal generating display data for displaying the data which is requested with the processing condition display request and thus retrieved from the data indicating the processing condition and stored in said processing condition management means, and supplying the display data to said at least one extension terminal so that the display data is displayed on the display of said at least one extension terminal.

2. The system according to claim 1, wherein said processing condition management means includes a function of measuring a call termination queue time of an incoming call when the incoming call is set in a call termination queue state by said call distribution function.

3. The system according to claim 2, wherein said display control means is switched to sequentially display office line numbers and queue times thereof in the order of longer call termination queue times measured by said processing condition management means every time a display changing operation is performed for the extension terminal as the display request source.

4. The system according to claim 1, wherein every time processing for a new incoming call is performed by said call distribution function, said processing condition management means updates the stored data indicating the processing condition in correspondence with the processing contents.

5. The system according to claim 4, wherein when the stored contents of said processing condition management means are updated during a display operation, said display control means generates display data on the basis of the updated new stored contents.

6. The system according to claim 1, wherein said processing condition management means includes a function of totalizing processing counts of incoming calls by said call distribution function in units of processing contents and storing the total data, and a function of measuring a call termination queue time of an incoming call when the incoming call is set in a call termination queue state by said call distribution function, and said display control means is alternately switched between a mode for displaying the total data totalized by said processing condition management means and a mode for displaying the call termination queue time measured by said processing condition management means every time a display changing operation is performed for the extension terminal as the display request source.

7. The system according to claim 1, wherein said at least one extension terminal includes:
first key input means for setting said at least one extension terminal in a password input state;
second key input means for inputting a password when said at least one extension terminal is set in a password input state by the first key input means; and
comparing means for comparing the password input by the second key input means with a preset password, and said at least one extension terminal allows said processing condition display request when said comparing means determines that the password matches with the preset password.

8. The system according to claim 7, wherein the display of said at least one extension terminal switches between a first display mode indicating that said at least one extension terminal is set in the password input state and a second display mode indicating that a result of comparison is being provided by said comparing means.

9. A call distribution system including a plurality of extension terminals, at least one of which has a display, and a mail unit connectable to the plurality of extension terminals via extensions and connected to a network via an office line, and which has, a call distribution function of grouping the plurality of extension terminals and distributing incoming calls received from the network to the plurality of extension terminals belonging to groups to receive the incoming calls, said main unit comprising:
processing condition management means for storing data indicating the number of incoming calls; and
display control means for receiving a predetermined processing condition display request output from said at least one extension terminal generating display data for displaying the data indicating the number of incoming calls which is stored by said processing condition management means, and supplying the display data to said at least one extension terminal so that the display data is displayed on the display of said at least one extension terminal.

10. The system according to claim 9, wherein every time processing for a new incoming call is performed by said call distribution function, said processing condition management means updates the stored data indicating the processing condition in correspondence with the processing contents.

11. The system according to claim 9, wherein said processing condition management means includes a function of totalizing processing counts of incoming calls by said call distribution function in units of processing contents and storing the total data, and a function of measuring a call termination queue time of an incoming call when the incoming call is set in a call termination queue state by said call distribution function, and
said display control means is alternately switched between a mode for displaying the total data totalized by said processing condition management means and a mode for displaying the call termination queue time measured by said processing condition management means every time a display changing operation is performed for the extension terminal as the display request source.

12. A call distribution system including a plurality of extension terminals, at least one of which has a display, and a main unit connectable to the plurality of extension terminals via extensions and connectable to a network via an office line, and which has a call distribution function of grouping the plurality of extension terminals and selectively distributing incoming calls received from the network to the plurality of extension terminals belonging to groups to receive the incoming calls, said main unit comprising:
processing condition management means for storing data indicating the number of answers to the incoming calls; and
display control means for receiving a, predetermined processing condition display request output from said at least one extension terminal generating display data for displaying the data indicating the number of answers which is stored by said processing condition management means, and supplying the display data to said at least one extension terminal so that the display data is displayed on the display of said at least one extension terminal.

13. The system according to claim 12, wherein every time processing for a new incoming call is performed by said call distribution function, said processing condition management means updates the stored data indicating the processing condition in correspondence with the processing contents.

14. The system according to claim 12, wherein said processing condition management means includes a function of totalizing processing counts of incoming calls in units of processing contents and storing the total data, and a function of measuring a call termination queue time of an incoming call when the incoming call is set in a call termination queue state by said call distribution function, and
said display control means is alternately switched between a mode for displaying the total data totalized by said processing condition management means and a mode for displaying the call termination queue time measured by said processing condition management means every time a display changing operation is performed for the extension terminal as the display request source.

15. A call distribution system including a plurality of extension terminals, at least one of which has a display, and a main unit connectable to the plurality of extension terminals via extensions and connectable to a network via an office line, and which has a call distribution function of grouping the plurality of extension terminals and distributing incoming calls received from the network to the plurality of extension terminals belonging to groups to receive the incoming calls, said main unit comprising:
processing condition management means for storing data indicating the number of times of processing incoming calls other than the incoming calls distributed by said call distribution function;
display control means for receiving a predetermined processing condition display request output from said at least one extension terminal generating display data for displaying the data indicating the number of the times of processing which is stored by said processing condition management means, and supplying the display data to said at least one extension terminal so that the display data is displayed on the display of said at least one extension terminal.

16. The system according to claim 15, wherein every time processing for a new incoming call is performed by said call distribution function, said processing condition management means updates the stored data indicating the processing condition in correspondence with the processing contents.

17. The system according to claim 15, wherein said processing condition management means includes a function of totalizing processing counts of incoming calls in units of processing contents and storing the total data, and a function of measuring a call termination queue time of an incoming call when the incoming call is set in a call termination queue state by said call distribution function, and said display control means is alternately switched between a mode for displaying the total data totalized by said processing condition management means and a mode for displaying the call termination queue time measured by said processing condition management means every time a display changing operation is performed for the extension terminal as the display request source.

18. A call distribution system including a plurality of extension terminals, at least one of which has a display, and a main unit connectable the plurality of extension terminals via extensions and connectable to a network via an office line, and which has a call distribution function of grouping the plurality of extension terminals and distributing incoming calls received from the network to the plurality of extension terminals belonging to groups to receive the incoming calls, said main unit comprising:

processing, condition management means for storing data indicating the number of office lines set in a call termination queue state by said call distribution function; and display control means for receiving a predetermined processing condition display request output from said at least one extension terminal generating display data for displaying the data indicating the number of office lines which is stored by said processing condition management means, and supplying the display data to said at least one extension terminal so that the display data is displayed on the display of said at least one extension terminal.

19. The system according to claim 18, wherein every time processing for a new incoming call is performed by said call distribution function, said processing condition management means updates the stored data indicating the processing condition in correspondence with the processing contents.

20. The system according to claim 18, wherein said processing condition management means includes a function of totalizing processing counts of incoming calls by said call distribution function in units of processing contents and storing the total data, and a function of measuring a call termination queue time of an incoming call when the incoming call is set in a call termination queue state by said call distribution function, and said display control means is alternately switched between a mode for displaying the total data totalized by said processing condition management means and a mode for displaying the call termination queue time measured by said processing condition management means every time a display changing operation is performed for the extension terminal as the display request source.

21. A call distribution system apparatus including a plurality of extension terminals, at least one of which has a display, and a main unit connectable to the plurality of extension terminals via extensions and connected to a network via an office line, and which has a call distribution function of grouping the plurality of extension terminals and distributing incoming calls received from the network to the plurality of extension terminals belonging to groups to receive the incoming calls, said main unit comprising:

processing condition management means for storing data indicating an office line number of an incoming call which is set in an agent call termination queue state by said call distribution function and data indicating a call termination queue time of the incoming call;

first display control means for receiving a predetermined processing condition display request output from said at least one extension terminal generating display data for displaying the data indicating the office line number and the data indicating the call termination queue time which are stored by said processing condition management means, and supplying the display data to said at least one extension terminal so that the display data is displayed on the display of said at least one extension terminal; and second display control means for switching the display data to data which indicates a call termination being made and a total call termination queue time of the incoming call when said office line is changed into an agent call termination state while the first display control means is displaying the office line number of the office line set in the call termination queue state and the call termination queue time on the display of said at least one extension terminal.

22. The system according to claim 21, wherein every time processing for a new incoming call is performed by said call distribution function, said processing condition management means updates the stored data indicating the processing condition in correspondence with the processing contents.

23. A call distribution system including a plurality of extension terminals, at least one of which has a display, and a main unit connectable to the plurality of extension terminals via extensions and connectable to a network via an office line and which has a call distribution function of grouping the plurality of extension terminals and distributing incoming calls received from the network to the plurality of extension terminals belonging to groups to receive the incoming calls, said main unit comprising:

processing condition management means for storing data indicating an office line number of an incoming call which is set in an agent call termination queue state by said call distribution function and a call termination queue time of the incoming call;

first display control means for receiving a predetermined processing condition display request output from said at least one extension terminal generating display data for displaying the data indicating the office line number and the data indicating the call termination queue time which are stored by said processing condition management means, and supplying the display data to said at least one extension terminal so that the display data is displayed on the display of said at least one extension terminal; and second display control means for switching the display data to data which indicates a call termination being canceled and a total call termination queue time of the incoming call when said office line is changed into a call stop state while the first display control means is displaying the office line number of the office line set in the call termination queue state and the call termination queue time on the display of said at least one extension terminal.

24. The system according to claim 23, wherein every time processing for a new incoming call is performed by said call distribution function, said processing condition management means updates the stored data indicating the processing condition in correspondence with the processing contents.

25. A call distribution system including a plurality of extension terminals, at least one of which has a display, and a main unit connectable to the plurality of extension terminals via extensions and connectable to a network via an office line, and which has a call distribution function of grouping the plurality of extension terminals and distributing incoming calls received from the network to the plurality of extension terminals belonging to groups to receive the incoming calls, said main unit comprising:

processing condition management means for monitoring a processing condition of the incoming calls, and storing data indicating the processing condition of the incoming call; and first display control means for receiving a predetermined processing condition display request output from said at least one extension terminal generating display data for displaying the data which is requested with the processing condition display request and thus retrieved from the data indicating the processing condition and stored in said processing condition management means, and supplying the display data to said at least one extension terminal so that the display data is displayed on the display of said at least one extension terminal; and second display control means for generating, display data on the basis of the data indicating new processing condition, and supply the updated display data to said at least one terminal at a predetermined time interval.

26. The system according to claim 1, wherein said at least one extension terminal includes:

key input means for inputting a password; and comparing means for comparing the password input by the key input means with a preset password, and said at least one extension terminal allows said processing condition display request when said comparing means determines that the password matches with the preset password.

* * * * *